United States Patent Office 3,422,943
Patented Jan. 21, 1969

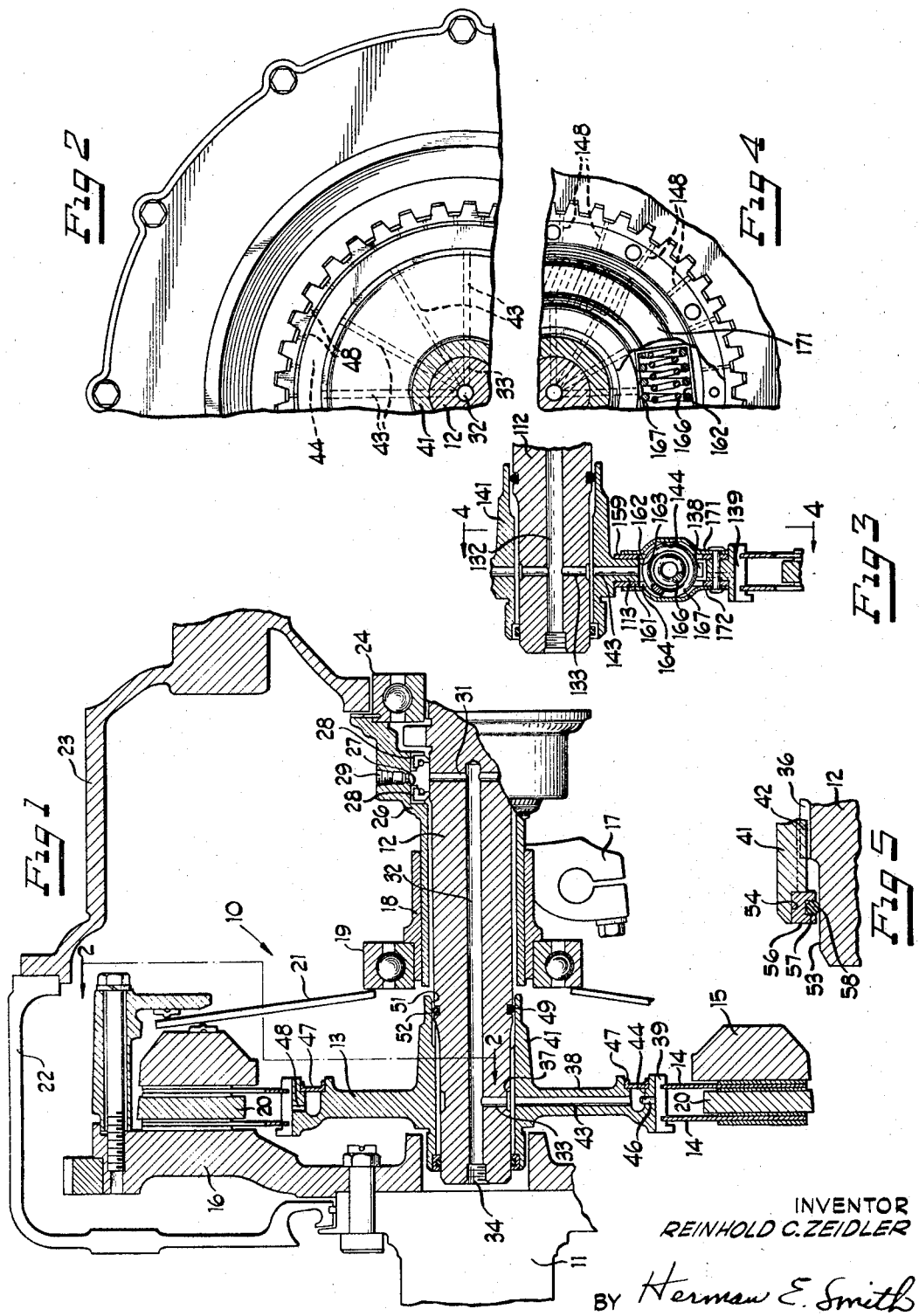

3,422,943
LUBRICATED CLUTCH ASSEMBLY
Reinhold C. Zeidler, Detroit, Mich., assignor to Borg-Warner Corporation, Chicago, Ill., a corporation of Illinois
Filed Feb. 8, 1967, Ser. No. 614,646
U.S. Cl. 192—113                    1 Claim
Int. Cl. F16d 13/74

ABSTRACT OF THE DISCLOSURE

A wet type friction disc clutch having a system of internal fluid distribution passages spraying fluid among the friction discs, in which fluid flow exists through a splined joint and, in one embodiment, through a damper apparatus.

Summary of the invention

The present invention relates generally to friction clutches and more particularly to means for effecting cooling and lubrication in a wet type clutch.

A principal object of the present invention is to provide an improved clutch assembly including a system of passages for directing the flow of fluid to the friction surfaces thereof.

Another object of the invention is to provide an improved arrangement of seals defining a fluid tight chamber for limiting leakage along a splined connection.

A further object of the invention is to provide a system of fluid passages including a circular manifold incorporated in the damper apparatus of a clutch assembly.

These and other objects and advantages of the invention will become apparent from the following description together with the drawings.

Brief description of the drawings

In the drawings:

FIGURE 1 is a section view of portions of a clutch assembly according to the present invention;

FIGURE 2 is a fragmentary view taken along the line 2—2 of FIGURE 1;

FIGURE 3 is a fragmentary view similar to FIGURE 1 showing a modified form of the invention;

FIGURE 4 is a view similar to FIGURE 2 taken along the line 4—4 of FIGURE 3; and FIGURE 5 is an enlarged fragmentary view of a portion of the fluid sealing arrangement.

Description of the preferred embodiments

Referring now in more detail to the drawings and particularly FIGURE 1 thereof, the reference character 10 indicates a friction clutch assembly. A rotatable power shaft 11 is frictionally coupled to driven shaft 12 by means of rotary member 13 having friction plates 14, 14 clamped between pressure plate 15 and flywheel 16. An actuating crank 17 is adapted for cooperation with axial slidable sleeve 18 to effect clamping movement of pressure plate 15 by means of bearing 19 and force multiplying lever 21. The housing portions 22, 23 form a non-rotatable enclosure for clutch assembly 10. Housing portion 23 provides a seat for bearing 24 which supports driven shaft 12 for rotation with respect to the enclosure. An extension 26 of the housing portion 23 provides a non-rotatable support for actuating sleeve 18.

Housing extension 26 is enlarged adjacent housing portion 23 to define a cavity 27 surrounding shaft 12. A pair of seals 28, 28 are seated in cavity 27 on either side of aperture 29 and encircle shaft 12 on either side of radial conduit 31. Seals 28, 28 thus provide a fluid tight joint between the non-rotatable housing portion 26 and rotatable shaft 12.

An axial conduit 32 extends inwardly from the end of shaft 12 so as to intersect radial conduits 31 and 33 providing a system of internal fluid passageways in shaft 12. A plug 34 is secured in the end of axial conduit 32 so that fluid introduced through aperture 29 into chamber 27 and conduits 31 and 32 is directed to conduit 33. Radial conduit 33 intersects an annular groove 37 surrounding the complement of external splines 36 on shaft 12.

Rotary member 13 includes a disc portion 38, a hub portion 41, and rim portion 39. As shown to enlarged scale in FIGURE 5, hub portion 41 is equipped with a complement of internal splines 42 adapted to mesh with splines 36 of shaft 12. Rotary member 13 is provided with radial passage 43 extending through rim portion 39, circular manifold 44, disc portion 38, and hub portion 41 defining a system of internal fluid passageways. This radial passage 43 intersects the complement of internal splines 42 at an axial position in alignment with annular groove 37 establishing communication with radial conduit 33. A plug 46 is secured in rim portion 39 so that fluid is delivered from radial passage 43 to annular reservoir 44. In the embodiment shown in FIGURE 1, reservoir 44 is formed by cover member 47 enclosing a cavity in rotary member 13.

A series of small radial orifices 48 is provided in rim portion 39 of rotary member 13 arranged to permit the flow of fluid from manifold 44 through the rim portion between friction plates 14, 14. The fluid impinges against the inner diameter of intermediate plate 20 and splashes and flows to both sides thereof toward friction plates 14, 14. A portion of the fluid passes through slots in friction plates 14 where it impinges against pressure plate 15 and flywheel 16. The fluid then moves radially outwardly through grooves in the facings of friction plates 14, 14 effectively cooling the surfaces of pressure plate 15, flywheel 16, and intermediate plate 20.

The possibility of fluid leakage along splines 36 and 42 is prevented by the arrangement of seals which form a fluid tight chamber enclosing the splines. At one end of the splines, shaft 12 is provided with a groove 49 forming a seat for an elastic seal member such as O-Ring 52. Hub portion 41 of radial member 13 is provided with a sealing surface 52 adapted to engage O-Ring 52. Sealing surface 51 is of slightly larger diameter than the major diameter of splines 42 thus providing a smooth continuous sealing surface immediately adjacent one end of the splines.

The terminal portion of shaft 12 includes a sealing surface 53 of a diameter smaller than the minor diameter of splines 36 thus providing an uninterrupted circumferential surface immediately adjacent splines 36. The corresponding end of hub portion 41 includes a counterbore 54 having a diameter greater than the major diameter of internal splines 42 providing an uninterrupted surface immediately adjacent the ends of splines 42.

A sealing ring 56 having a groove 57 is pressed into counterbore 54 providing a fluid tight seal at the ends of splines 42. A second O-Ring 58 is disposed within groove 57 and encircules the shaft sealing surface 53 to complete the fluid tight sealing of the other end of splines 36, 42.

Referring now in more detail to FIGURES 3 and 4 there is show a modified form of the apparatus in which the annular fluid manifold 144 is incorporated in the damper portion of a clutch assembly. A shaft 112 is provided with an axial conduit 132 intersected by radial conduit 133 which is in alignment with radial passage 143 extending through hub portion 141 of rotary member 113.

A first flange 138 extends radially from hub portion 141 and is frictionally gripped between second and third flanges 159, 161 extending inwardly from rim portion 139. Flanges 138, 159 and 161 are provided with windows or apertures as indicated by 162, 163, 164 for reception of damper springs 166, 167. The flanges and springs cooperate with each other in an manner well known in the art to provide a frictionally damped resilient drive coupling between hub 141 and rim 139 of rotary member 113. A pair of annular housing members 171 and 172 are secured to flanges 159 and 161 to provide an annular fluid manifold from which fluid is released between the friction plates by means of radial orifices 148.

While a preferred form of the invention has been shown and described together with a modified form thereof, it is to be understood that other modifications and variations thereof are included within the spirit and scope of the following claim.

I claim:

1. In a clutch assembly (10) including a rotary friction member (13, 113) and a shaft (12, 112), said shaft having a complement of external splines (36), and said friction member including a hub (41, 141) having a complement of internal splines (42), said external and internal splines being interengageable with each other and slidable with respect to each other in the endwise direction forming a drive connection between said shaft and friction member, the improvement comprising a system of internal fluid passageways (43, 143, 44, 48, 148) in said friction member and a system of cooperating internal fluid passageways (31, 32, 132, 33, 133) in said shaft, said shaft being provided with a groove (49) adjacent one extremity of said external splines having an elastic sealing member (52) therein, sealingly engaging an internal sealing surface (51) in one end of said hub larger in diameter than the major diameter of said internal splines, and a sealing ring (56) sealingly fixed to the other end of said hub, said sealing ring carrying an elastic sealing element (58) engaging a sealing surface (53) on said shaft smaller in diameter than the minor diameter of said external splines whereby fluid is transmitted from said shaft to said friction member without leakage at the hub ends while accommodating endwise sliding movement of said splines.

References Cited

UNITED STATES PATENTS

| | | | |
|---|---|---|---|
| 2,523,501 | 9/1950 | Davies et al. | |
| 2,687,198 | 8/1954 | Greenlee | 192—113.2 |
| 2,968,368 | 1/1961 | Schjolin et al. | 192—113.2 X |
| 2,854,112 | 9/1958 | Parrett | 192—85 |

BENJAMIN W. WYCHE III, *Primary Examiner.*

U.S. Cl. X.R.

188—264